(12) United States Patent
Heuser (10) Patent No.: US 11,727,291 B2
(45) Date of Patent: Aug. 15, 2023

(54) PREDICTING DISENGAGEMENT AND SELECTIVELY DELIVERING ENGAGEMENT CONTENT

(71) Applicant: Microsoft Technology Licensing, LLC, Redmond, WA (US)

(72) Inventor: Christopher Wallace Heuser, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 861 days.

(21) Appl. No.: 16/520,157

(22) Filed: Jul. 23, 2019

(65) Prior Publication Data
US 2021/0027184 A1    Jan. 28, 2021

(51) Int. Cl.
*G06N 5/048* (2023.01)
*A63F 13/79* (2014.01)
*G06N 20/00* (2019.01)

(52) U.S. Cl.
CPC ............. *G06N 5/048* (2013.01); *A63F 13/79* (2014.09); *G06N 20/00* (2019.01); *A63F 2300/5546* (2013.01)

(58) Field of Classification Search
CPC ........ G06N 5/048; G06N 20/00; A63F 13/79; A63F 13/67; A63F 2300/5546
See application file for complete search history.

(56) References Cited

U.S. PATENT DOCUMENTS

| | | | |
|---|---|---|---|
| 2005/0070359 A1* | 3/2005 | Rodriquez | A63F 13/795 463/42 |
| 2013/0116022 A1* | 5/2013 | Davison | A63F 13/00 463/9 |
| 2013/0268393 A1* | 10/2013 | Haze | A63F 13/67 |
| 2015/0039427 A1* | 2/2015 | Elbouchikhi | G06Q 30/0255 705/14.53 |
| 2019/0279096 A1* | 9/2019 | de Nijs | G06F 16/9536 |
| 2020/0005196 A1* | 1/2020 | Cai | G06F 16/9535 |
| 2020/0206631 A1* | 7/2020 | Sumant | G06V 40/20 |

OTHER PUBLICATIONS

"International Search Report and Written Opinion Issued in PCT Application No. PCT/US20/036719", dated Sep. 29, 2020, 12 Pages.

* cited by examiner

*Primary Examiner* — Kevin Y Kim
(74) *Attorney, Agent, or Firm* — Ray Quinney & Nebeker P.C; James Bullough (57) ABSTRACT

The present disclosure relates to systems, methods, and computer-readable media to predict disengagement of a user from a gaming application and generate a recommendation for delivery to the user based on the predicted disengagement. For example, systems disclosed herein may train, receive, or otherwise obtain a disengagement prediction model trained to predict whether a user will disengage from a gaming application within a predetermined period of time. Systems described herein can further collect gaming data including system platform data and publisher-specific data to provide to the prediction model for use in determining a disengagement metric for the user. The systems disclosed herein may further generate a recommendation based on the disengagement metric and deliver the recommendation to a client device associated with the user.

20 Claims, 7 Drawing Sheets

PREDICTING DISENGAGEMENT AND SELECTIVELY DELIVERING ENGAGEMENT CONTENT

CROSS-REFERENCE TO RELATED APPLICATIONS

N/A

BACKGROUND

Advancements in computing devices and network technology have led to a variety of innovations and platforms in providing digital content (e.g., digital media, gaming content) across computer networks. For example, multiple platforms now exist that are capable of providing digital content from a variety of publishers of the digital content. Whether in entertainment, employment, advertising, or online gaming, digital content systems are able to provide instantaneous digital content to thousands of users via a variety of client devices.

Conventional systems often provide recommendations for new or related content to the digital content that individuals consume or interact with via a platform. For example, digital media platforms typically provide recommendations at key moments when an individual might be interested in receiving the recommendation. Conventional systems typically generate and add tags to digital content at those key moments (e.g., at or near the end of an episode, at or near the end of a movie) and provide options for alternative content at these key moments. Alternatively, conventional systems may generate recommendations to view upon logging in to an account for a media platform or providing daily emails including recommendations for related content.

Conventional techniques for delivering new or related content for consumption via a platform (e.g., gaming content, digital videos), however, are often inefficient or ineffective. For example, while many individuals choose to disengage from a program or application at predictable moments (e.g., at the end of an episode or upon completing a final objective of a video game), conventional content delivery systems often fail to identify less predictable moments at which individuals may disengage either temporarily or permanently from a provider's platform (e.g., upon completing a game objective, individual schedules, etc.). Moreover, while individuals disengage from a variety of reasons, many individuals disengage from a system or platform as a result of a negative experience with a piece of content. As a result, providers of a variety of digital content (e.g., video content, gaming content) often fail to provide a positive experience for end-users who may permanently disengage from a platform or piece of content after having a negative experience.

These and other problems exist with regard to providing new or related gaming content that effectively engages end-users.

DETAILED DESCRIPTION

The present disclosure relates generally to an engagement system for generating and providing timely recommendations to facilitate higher engagement among users of a gaming platform service with content (e.g., gaming content) provided by one or more publishers. In particular, as will be discussed in further detail below, an engagement system may collect gaming data associated with a plurality of users (e.g., training users) to train, generate, or otherwise create a disengagement prediction model configured to (e.g., trained to) generate a prediction of whether an individual associated with a set of corresponding gaming data is likely to disengage from a gaming application (or gaming platform service). As will be discussed in further detail below, the engagement system can collect a variety of gaming data including publisher gaming data and platform gaming data and model an algorithm, machine learning model, or other disengagement prediction model to generate a disengagement metric based on gaming data for a corresponding user.

In addition to generating or receiving a disengagement prediction model, the engagement system can apply the disengagement prediction model to a set of gaming data associated with an individual (e.g., a user of a gaming application) to determine whether the individual is likely to disengage from a gaming application. For example, the engagement system can utilize the disengagement prediction model to analyze a set of gaming data including any number of characteristics associated with the user (e.g., gameplay data, social data, profile data, engagement/disengagement data) to determine a disengagement metric for the user that characterizes whether a user will disengage from gaming content at a specific time or within a predetermined period of time. As will be discussed below, the disengagement metric may include a variety of characteristics indicating reasons for disengagement as well as a likelihood that the user will disengage from the gaming application within a predetermined period of time.

The engagement system can further take a number of actions based on an output of the disengagement prediction model. For example, in one or more implementations described herein, the engagement system can generate a unique recommendation (or multiple recommendations) for a user based on one or multiple disengagement metrics generated for the user. For instance, the engagement system can generate recommendations to facilitate continued engagement with a gaming application (e.g., in-game bonus, in-game offer, a selectable option to join a co-user also engaged with the gaming application). Alternatively, the engagement system can generate recommendations associated with different gaming applications (e.g., a new game recommendation, a recommendation to play a previously purchased game, or a recommendation to join a friend currently engaged with another gaming application).

In addition to generating a variety of recommendations, the engagement system can provide the recommendations in a variety of ways. For example, the engagement system can provide in-game recommendations including displayed content, notifications for received messages, or other recommendation provided concurrent with a user actively engaging a gaming application. The engagement system can further provide recommendations at times when a user is not actively engaged, but when the user will be nonetheless receptive to receiving a recommendation in connection with the same or different gaming application. Moreover, the engagement system can deliver recommendations using a variety of communication mediums (e.g., via a gaming console, via a mobile device) based on a variety of observed factors.

The present disclosure includes a number of practical applications that provide benefits and/or solve problems associated with delivering gaming content and facilitating a positive engagement by users of a gaming platform with gaming content. For example, as mentioned above, the engagement system can facilitate timely delivery of recommendations without interrupting or otherwise detracting from a current gaming experience. For instance, the engagement system can provide in-game recommendations that interface with gaming content to enhance a current gaming experience (e.g., in-game bonuses, recommendations to join with one or more co-users). In addition, or as an alternative, the engagement system can provide recommendations via a variety of communication channels at times when the user will take note of the recommendations without detracting from a gaming experience.

In addition to providing timely recommendation, the engagement system can consider information associated with a user including historical usage data and a current state of data for the user to best determine when and how to engage the user with gaming content. For example, the engagement system can generate and provide recommendations based on unique social data for the user. The engagement system can additionally consider historical trends of gaming data (e.g., observed gameplay data, historical schedule of gameplay with a specific application or across multiple applications on a platform). Further, the engagement system can provide unique and personalized recommendations based on identified preferences of an individual in connection with different types of gaming content to enhance a gaming experience for the user rather than disrupting or reducing engagement.

Moreover, by training a machine learning model or generating one or more algorithms that effectively predict when and why an individual is likely to disengage, the engagement system enables timely delivery of recommendations in a way that does not involve a publisher (e.g., a developer) or other individual tagging digital content based on generally applicable predictions for the population as a whole. By implementing a disengagement model capable of generating a personalized disengagement metric, the engagement system can avoid an expensive and non-scalable and/or computationally prohibitive process such as individually tagging gaming content or other consumable content to facilitate delivery of recommendations at generally applicable key moments. Rather, the engagement system can dynamically generate and provide recommendations including dynamic content uniquely directed to an individual and delivered in such a way as to enhance a gaming experience associated with a corresponding publisher.

As illustrated in the foregoing discussion, the present disclosure utilizes a variety of terms to describe features and advantages of the systems described herein. Additional detail is now provided regarding the meaning of such terms. As used herein, "gaming data" may refer to any information associated with users and corresponding gaming applications with which the users have engaged. For example, gaming data may include publisher gaming data (or simply publisher data) including information tracked or otherwise observed by a publisher or provider of gaming content while users engage or otherwise interact with gaming content. Publisher data may refer to data such as gameplay data (e.g., tracked kills, win/loss record, level data, character data), timing data (e.g., duration/frequency of gameplay), social data, or other data tracked by a publisher system. As another example, gaming data may include platform system data (or simply system data) including publisher-agnostic gaming data tracked or otherwise observed by a gaming platform service that serves as a platform for gaming applications across multiple publishers. Further examples of publisher data and system data are discussed below (e.g., in connection with FIG. 2).

As used herein, a "publisher system" refers to a server or other system of devices associated with a publisher of gaming content. As discussed herein, a publisher system may refer to one or more server devices that tracks or otherwise collects gaming data such as gameplay statistics, duration, and/or frequency of gameplay, as well as other information associated with a specific gaming application. In one or more embodiments, a publisher system refers to a gaming server that serves content directly to a user. Alternatively, a publisher system may collect gaming data associated with gaming content served by a client device (e.g., rather than directly from the publisher system). As used herein, a publisher may refer to an originator, creator, developer, or other entity associated with delivering or otherwise providing gaming content to users.

As used herein, a "gaming platform" or "gaming platform service" refers to a server platform over which one or more services may be provided to client devices (e.g., gaming devices) that serve gaming content to end-users. For example, a gaming platform service may refer to a centralized platform over which users may purchase and/or install gaming applications, subscribe to various services or gaming content, and/or engage with gaming content hosted by the gaming platform service. In one or more implementations, a gaming platform service refers to a cloud-based service. A gaming platform service may provide an interface over which users of the service may purchase or subscribe to applications across different publishers and with which users may connect with other users (e.g., co-users) of the gaming platform service.

As mentioned above, the engagement system can generate a disengagement prediction model. As used herein, a "disengagement prediction model" may refer to any model or algorithm(s) trained to generate an output including one or more disengagement metrics for a user associated with a set of data input to the disengagement model. The disengagement model may refer to one or more of a computer algorithm, a classification model, a regression model, or other model having a defined functionality associated with predicting disengagement of a user with respect to gaming content for one or more gaming applications. The disengagement prediction model may additionally refer to a deep learning model such as a neural network or other machine learning architecture trained to observe gaming data and output one or more disengagement metrics associated with a prediction or likelihood that an associated user will disengage from gaming content.

As used herein, a "disengagement metric" may refer to a variety of outputs associated with a prediction of whether an individual will disengage from receiving gaming content. For example, a disengagement metric may indicate a probability that a user will stop playing a game either temporarily or permanently. A disengagement metric may further include a classification of risk (e.g., high, medium low) or a probability that the user will disengage temporarily or permanently from gaming content for a specific gaming application as determined by the disengagement prediction model. A disengagement metric may further include an indication or value indicative of a timing that an individual will disengage from receiving gaming content.

As used herein, a "recommendation" may refer to any communication provided to a user of a gaming platform in connection with a gaming application. As an example, a recommendation may refer to an in-game communication or notification provided within an interface of gaming content. A recommendation may further refer to a communication or notification provided via an interface of the gaming platform service. A recommendation may further refer to a communication provided via a client device such as a gaming console or via a computing device or mobile device independent from the gaming console or other gaming device. A recommendation may refer to a communication associated with a gaming application from which a user is about to disengage or another gaming application associated with the same or different publisher. As will be discussed in further detail below, a recommendation may include a variety of content therein based on a game-type, preferences of an individual, a disengagement metric, or other information associated with a user or gaming content.

As used herein, a user may be engaged with or disengaged from a gaming application. For example, a user may be engaged with a gaming application when the user is receiving and/or interacting with gaming content provided via a client device (e.g., a gaming device) of the user. For instance, a user may be currently engaged with a gaming application when the user is actively playing or interacting with gaming content associated with the gaming application.

As will be discussed in further detail below, a user may become temporarily or permanently disengaged from a gaming application. A user may be classified as temporarily disengaged when the user is not currently engaged with gaming content, but is predicted to re-engage at a later time (or has not been disengaged for longer than a threshold period of time). A user may be classified as permanently disengaged when a user is not engaged with gaming content and is not predicted to re-engage at a later time (or has been disengaged for longer than the threshold period of time). As will be discussed in further detail below, disengagement metrics may be associated predictions of whether an individual will temporarily and/or permanently disengage from receiving gaming content for a corresponding gaming application.

One or more embodiments described herein relate specifically to predicting disengagement of users with respect to gaming content (e.g., video game content) as well as providing recommendations in connection with the gaming content. Nevertheless, features and functionality discussed herein in connection with predicting disengagement and providing recommendations in connection with gaming content is provided by way of example and can apply to other types of digital content. For example, features and functionality discussed herein in connection with generating recommendations to enhance engagement with gaming content may similarly apply to generating recommendations to enhance engagement or consumption of streaming media content from various publishers and hosted by digital media platforms.

Figure 1:
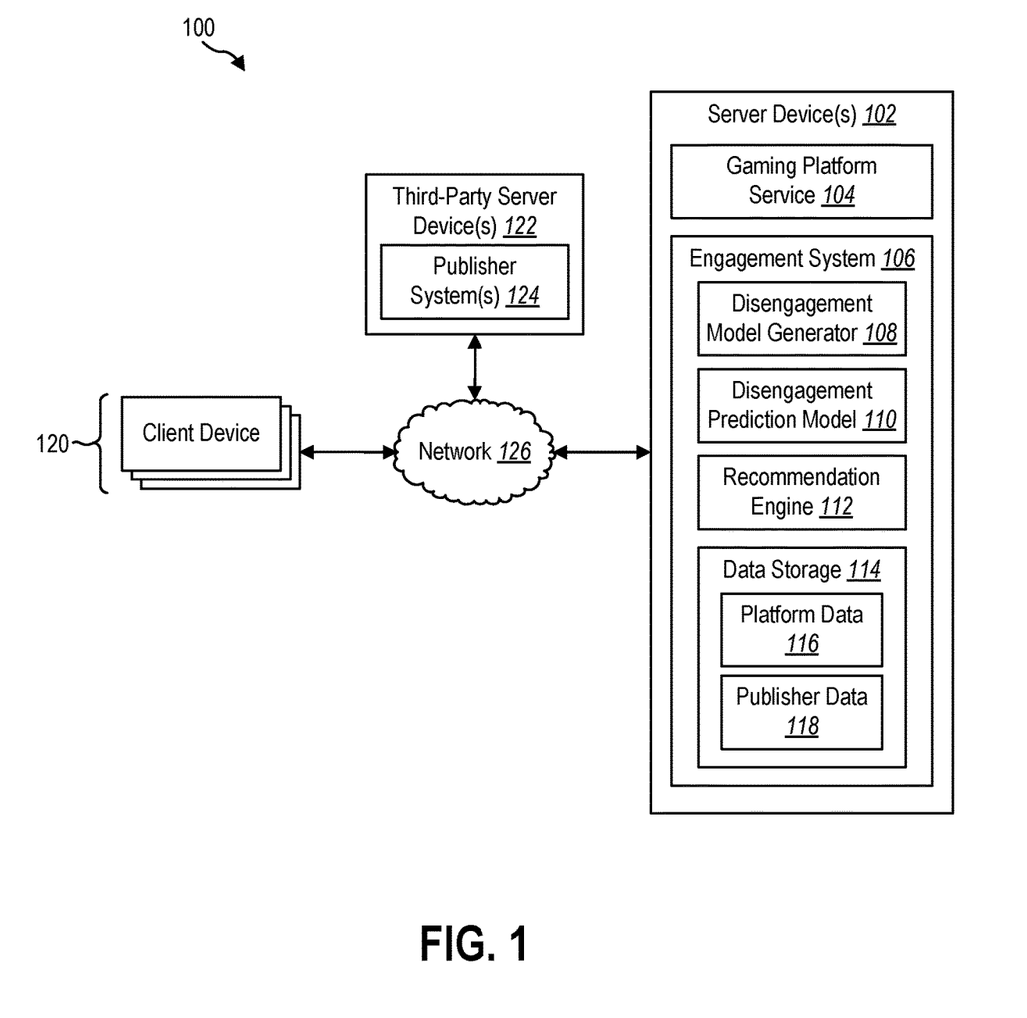
FIG. 1 illustrates an example environment including an engagement system in accordance with one or more embodiments.

Additional detail will now be provided regarding systems for determining disengagement metrics and providing recommendations to computing devices in relation to illustrative figures portraying example implementations. For example, FIG. 1 illustrates an example environment 100 in which an engagement system is implemented in accordance with one or more embodiments described herein. As shown in FIG. 1, the environment 100 includes one or more server device(s) 102, which may refer to servers of a gaming platform. The server device(s) 102 may include a gaming platform service 104 and an engagement system 106, which may include a disengagement model generator 108, a disengagement prediction model 110, a recommendation engine 112, and a data storage 114 having platform data 116 and publisher data 118 stored thereon. The environment 100 may further include a plurality of client devices 120 and one or more third-party server device(s) 122, which may include any number of publisher system(s) 124.

As shown in FIG. 1, the server device(s) 102, client devices 120, and third-party server device(s) 122 may communicate with each other directly or indirectly through a network 126. The network 126 may include one or multiple networks and may use one or more communication platforms or technologies suitable for transmitting data. The network 126 may refer to any data link that enables transport of electronic data between devices and/or modules of the environment 100. The network 126 may refer to a hardwired network, a wireless network, or a combination of a hardwired and a wireless network. In one or more embodiments, the network 126 includes the Internet.

The client devices 120 may refer to various types of computing devices. For example, one or more of the client devices 120 may include a mobile device such as a mobile telephone, a smart phone, a personal digital assistant (PDA), a tablet, or a laptop. Additionally, or alternatively, the client devices 120 may include one or more non-mobile devices such as a desktop computer, server device, or other non-portable device. In one or more implementations, the client devices 120 refer to dedicated gaming devices (e.g., handheld gaming devices) or a video game console in communication with a display device. In one or more implementations, one or more of the client devices 120 include graphical user interfaces thereon (e.g., a screen of a mobile device). In addition, or as an alternative, one or more of the client devices 120 may be communicatively coupled (e.g., wired or wirelessly) to a display device having a graphical user interface thereon for providing a display of gaming content. The server device(s) 102 and/or third-party server device(s) 122 may similarly refer to various types of computing devices. Each of the devices of the environment 100 may include features and functionality described below in connection with FIG. 7.

As shown in FIG. 1, the gaming platform service 104 may provide a platform interface that provides access to a platform over which users of the client devices 120 may interact with co-users of the platform as well as navigate and purchase various applications associated with one or more publishers. For example, the gaming platform service 104 may refer to a centralized platform, marketplace, or system over which different publishers can provide access to gaming applications.

As further shown in FIG. 1, the environment includes any number of third-party server device(s) 122 including publisher system(s) 124 implemented thereon. The publisher system(s) 124 may include gaming servers (e.g., third-party gaming servers) that host or otherwise serve gaming content to the plurality of client devices 120. While FIG. 1 illustrates an example in which publisher system(s) 124 are implemented on third-party server device(s) 122 independent from a network of server device(s) 102 that include the gaming platform service 104 and engagement system 106. In one or more implementations, one or more of the publisher systems 124 may be implemented as part of or on the same network of server device(s) 102 as the gaming platform service 104. Indeed, in one or more embodiments, the gaming platform service 104 includes one or more publisher systems implemented thereon.

Each of the gaming platform service 104 and publisher systems 124 can provide content to the client devices 120 and collect gaming data (e.g., telemetry data) associated with respective users of the client devices 120. For example, each of the publisher systems 124 may collect publisher gaming data including information unique to one or more gaming applications associated with the corresponding publisher system. Further, the gaming platform service 104 may collect publisher agnostic data including any information associated with the users of the client devices 120 collected by the gaming platform service 104. The gaming platform service 104 and the publisher system(s) 124 may provide respective types of gaming data to the engagement system 106. As shown in FIG. 1, the engagement system 106 may store the platform data 116 (e.g., platform gaming data) and publisher data 118 (e.g., publisher gaming data) on a data storage 114 implemented on or otherwise accessible to the server device(s) 102.

Upon receiving the gaming data from the gaming platform service 104 and publisher system(s) 124, the engagement system 106 can utilize the gaming data in a variety of ways. For example, as mentioned above, the engagement system 106 may include a disengagement model generator 108 for training, generating, or otherwise obtaining a disengagement prediction model 110 trained to determine a disengagement metric for a given user based on a corresponding set of gaming data. For example, the disengagement model 108 may identify or learn trends or specific correlations between features and characteristics of the gaming data and identified disengagements of users of the client devices 120 from corresponding gaming applications of various types.

In one or more embodiments, the disengagement model generator 108 is implemented on a same or shared network of server device(s) 102 as the gaming platform service 104 (e.g., on the same cloud computing system). Alternatively, in one or more implementations, the disengagement model generator 108 is implemented on an independent network of server devices (e.g., a third-party server device) to perform a training process. In this example, the engagement system 106 may receive the disengagement prediction model from a third-party server device on which the prediction model 110 was trained.

As will be discussed below, the engagement system 106 may determine a disengagement metric for a user by collecting a set of gaming data for the user and applying the disengagement prediction model to the set of gaming data. In particular, the disengagement prediction model may output one or more disengagement metrics associated with a likelihood that the user associated with the set of gaming data will disengage from a gaming application. As mentioned above, the disengagement metric may refer to a variety of outputs or values indicative of whether a user will disengage from one or more gaming applications.

The disengagement metric(s) may be provided to the recommendation engine for determining or generating a recommendation to deliver to a client device of the user associated with the set of gaming data. In particular, the recommendation engine 112 may generate a recommendation based on the disengagement metric including content directed to the user based on the associated gaming data. In addition, the recommendation engine 112 may utilize the disengagement metric to identify a timing of delivery of the recommendation as well as a device on which to provide the recommendation. Further detail about generating and delivering a recommendation will be discussed below in connection with FIG. 3.

Figure 2:
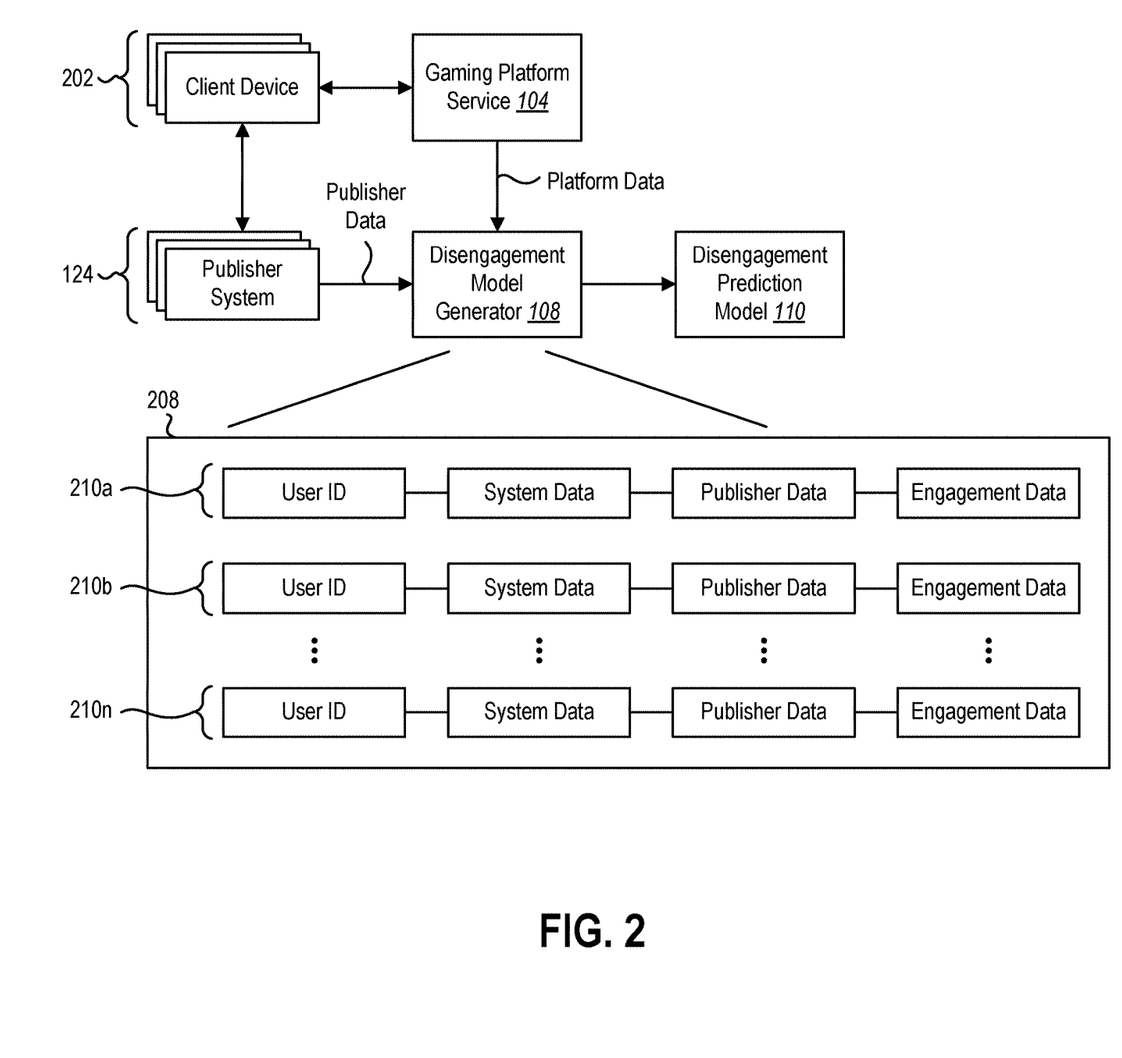
FIG. 2 illustrates an example implementation of the engagement system for generating a disengagement prediction model in accordance with one or more embodiments.

FIG. 2 illustrates an example implementation in which the engagement system 106 facilitates training or otherwise obtaining the disengagement prediction model 110 in accordance with one or more embodiments described herein. As shown in FIG. 2, a plurality of client devices 202 (e.g., training devices) may interact with or engage with a plurality of publisher systems 124. For example, the publisher system 124 may serve or otherwise provide gaming content to the client devices 202 with which users of the client devices 202 may engage. The client devices 202 may include similar characteristics as the plurality of client devices 120 shown in FIG. 1. The publisher systems 124 may include any number of publisher systems 124 similar to the publisher system 124 of FIG. 1 and may be implemented on a combination of third-party server devices or on a common network of devices as the gaming platform service 104.

As shown in FIG. 2, the publisher system 124 can detect, track, or otherwise observe activity of users of the client devices 202 with respect to gaming applications associated with corresponding publisher system 124. For example, a first publisher system that provides a first gaming application may observe and collect publisher-specific data for the first gaming application while a second publisher system that provides a second gaming application may observe and collect publisher-specific data for the second gaming application. The publisher systems 124 may provide publisher data (e.g., publisher gaming data) to the disengagement model generator 108 for use in generating the disengagement prediction model 110.

As further shown in FIG. 2, the gaming platform service 104 may detect, track, or otherwise observe activity of users of the client devices 202 with respect to a system platform. For example, the gaming platform service 104 may observe and collect activity of users of the client devices 202 with respect to other users (e.g., co-users) of a platform as well as activity of users across a plurality of gaming application associated with the different publisher systems 124. The publisher system 124 may provide the publisher data to the disengagement model generator 108.

In one or more implementations, the publisher systems 124 provide the publisher data to the gaming platform service 104 for compiling the gaming data from the respective sources to provide as input to the disengagement model generator 108. As shown in FIG. 2, the disengagement model generator 108 (or the gaming platform service 104) may generate or compile a collection of gaming data 208 including a variety of different types of information associated with a set of users (e.g., training users) of the client devices 202.

By way of example, FIG. 2 illustrates an example collection of gaming data 208 including different types of information associated with users of the gaming platform service 104. For example, the collection of gaming data 208 may include individual entries of sets of data for corresponding users including a first set of gaming data 210a corresponding to a first user, a second set of gaming data 210b corresponding to a second user, and any number of sets of gaming data up to an Nth set of gaming data 210n associated with an Nth user.

Each of the different subsets of data within the respective sets of gaming data 210a-n may refer to different types of gaming data collected by and used by the disengagement model generator 108 for generating the disengagement prediction model 110. For example, each of the respective subsets of gaming data may include a user identifier for associating respective types of gaming data with a corresponding user. The user identifier may refer to a username, a unique user number, or other data usable by the gaming platform service 104 to map portions of gaming data to an associated user.

As further shown, each set of gaming data 210a-n may include system data (e.g., platform data), which may refer to any data collected by the gaming platform service 104. The system data may include publisher-agnostic data not necessarily associated with any of the specific publisher systems 124. For example, the system data may include profile data including data associated with a corresponding user of the gaming platform service 104. The profile data may include information associated with a user account of the gaming platform service 104 such as demographic information, user location information, network information (e.g., network speed, bandwidth), gaming device data, or other information unique to a specific user or associated client device. The profile data may indicate one or multiple gaming devices used in conjunction with an associated user ID. The profile data may further include email(s), phone numbers, or other information for use in delivering communications (e.g., an out-of-game recommendation) to a user.

The system data may further include user preference data. For example, preference data may include a preferred method of communication for receiving recommendations or other communications from the gaming platform service 104. For instance, a user may indicate that they would only like to receive certain types of recommendations or communications (e.g., in-game communications, out-of-game communications) or may indicate a preference to only receive recommendations of certain types (e.g., in-game offers, in-game boosts, invitations to join games of co-users). While this preference information may not necessarily be used in training the disengagement prediction model as shown in FIG. 2, this information may nonetheless be used in generating and providing recommendations to one or more users of the gaming platform service 104, as discussed in further detail below.

In one or more implementations, the system data includes social data associated with users of the client devices 202. For example, social data may include an identification of "friends" or connections of a user on the gaming platform service 104. The social data may further include multi-player statistics such as a percentage of games that a user plays solo or with co-users of the gaming platform service 104. The social data may further indicate a social score associated with a frequency or quantity that an associated user interacts with or engages other co-users of the gaming platform service 104.

The system data may further include usage data across multiple publisher systems 124. For example, the usage data may include any gameplay statistics collected by the gaming platform service 104. The usage data may further include timing data indicating a frequency and duration that a user engages with one or multiple gaming application via the gaming platform service 104. The usage data may include an identification of any number of gaming applications owned or previously purchased as well as data associated with a duration and/or frequency that the user has engaged with those gaming applications.

The system data may further include other types of data collected by or otherwise observed by the gaming platform service 104 associated with the respective users. For example, even where preference data may indicate a preferred type of game or application, the system data may further include an observed preference of game-type or pattern of engagement between different types of games. For example, the gaming platform service 104 may observe that an individual prefers role-playing games (RPGs), real-time strategy (RTS) games, sports games, team games, puzzle games, first-person games, open-world games, or other categories of gaming applications that may be used to classify a wide variety of gaming applications associated with respective publisher systems 124.

As further shown in FIG. 2, the collection of gaming data 208 may include publisher data including publisher-specific data collected by the publisher systems 124 associated with respective gaming applications provided by the publisher system 124. For example, the publisher data may include any data collected by publishers in connection with each of the users of the client devices 202 that engage with gaming content provided by the publisher systems 124.

Similar to the system data, the publisher data may refer to a variety of different types of data. For example, the publisher data may include gameplay data associated with respective games. This may include a number of "kills," a win/loss record over a period of time, completion statistics (e.g., percentages) associated with in-game objectives, quest data, level data (e.g., player level, level progress), in-game items or other types of gameplay data. Gameplay data may further include more complex data or observed trends of gameplay for users such as a style of play (e.g., aggressive style, support style, passive style, etc.) as determined by a publisher.

As another example, the publisher data may include timing data. For instance, the publisher data may include timing statistics such as a duration or frequency that a user plays, opens, or otherwise engages with a gaming application. This may further include social data such as whether an individual participates with other players and/or by themselves and for how long or how often. In some instances, the gaming platform service 104 may associate social data for a specific publisher with social data of the gaming platform service 104.

The publisher data may further include disengagement statistics. For example, the publisher data may include a time of disengagement from a particular gaming application (e.g., a time that the user became inactive, closed an application, or otherwise ceased receiving gaming content). This disengagement data may include an indication of whether the disengagement occurred mid-game, during a multi-player game, at the end of a defined objective (e.g., at the end of a level), or other definable point within a game.

Examples of gaming data discussed above are provided by way of example and are not necessarily limited to either system data (e.g., data collected by the gaming platform system 104) or publisher data (e.g., data collected by a publisher system from the plurality of publisher systems 124). In particular, it will be understood that system data and publisher data may include overlapping data between the system data and publisher data. As an illustrative example, different timing data, gameplay data, and/or social data may be tracked by one or both of a publisher system and a gaming platform service. Accordingly, specific types of gaming data discussed in connection with specific embodiments herein may refer to either system data or publisher data depending on a system or service that tracked the corresponding gaming data.

As shown in FIG. 2, the collection of gaming data may further include engagement data indicating a current and/or historical level of engagement with one or more gaming applications and/or with the gaming platform service 104 generally. For example, the engagement data may include an engagement score for an associated gaming application based on a function of duration and frequency that a user has engaged with a gaming application. The engagement data may further include identified trends of engagement scores over time indicating an increased engagement or decreased engagement with the gaming application over time.

The engagement data may also indicate engagement score(s) and/or trends of engagement over time with respective to various game-types. For instance, the engagement data may indicate that a user engages significantly more with multi-player games, RPG games, or other types of games based on engagement scores associated with multiple gaming applications and across multiple publishers. The engagement data may further indicate a level of engagement with different co-users (e.g., that the user spends a significant amount of time with a specific co-user or group of co-users). The engagement data may indicate any number of engagement-related statistics for a given user.

Each of the various types of gaming data included within the collection of gaming data 208 may be utilized by the disengagement model generator 108 to generate and/or train the disengagement prediction model 110. This may include identifying correlations between associated system data, publisher data, and/or engagement data. This may further include iteratively refining the disengagement prediction model 110 as further training data becomes available and/or as new gaming applications are provided via the gaming platform service 104 and/or the publisher systems 124.

Because the publisher data may vary between publisher systems 124, as the disengagement model generator 108 identifies important datapoints and/or as important correlations associated with a predicted disengagement become known, the gaming platform service 104 may identify and request specific types of data from the publisher system 124 for use in training or fine-tuning algorithms used by the disengagement prediction model 110 as well as for use in determining disengagement metrics based on collected gaming data for individual users.

As mentioned above, the disengagement prediction model 110 may be trained to generate an output including a disengagement metric for a corresponding user based on associated gaming data. As further discussed, the disengagement metric may include a variety of different metrics associated with a likelihood that a user will disengage from a specific gaming application (or from the gaming platform service 104 altogether). For example, in one or more implementations, the disengagement metric includes a predicted likelihood that a user will temporarily or permanently disengage from a gaming application within a predetermined period of time (e.g., 1-3 days, 1-3 minutes) given a set of gaming data associated with the user.

In one or more embodiments, the disengagement metric includes an indication of one or more signals (e.g., key performance indicators) associated with a prediction that a user will disengage. For example, the disengagement prediction model 110 may output one or multiple key performance indicators identified for a user determined to be associated with disengagement from a gaming application. In this way, in addition to providing a general prediction of when a user is likely to disengage, the disengagement metric may further indicate one or more signals or indicators as to why the user is predicted to disengage (e.g., reduced frequency of game-play, one or more co-users that have recently disengaged) that may be helpful in determining a recommendation to provide to the user.

As another example, the disengagement model 110 may be trained to output a disengagement metric indicating a classification of likelihood that the user will disengage from a gaming application given a set of gaming data. For example, the disengagement model 110 may be trained to output a category of disengagement risk (e.g., high risk, medium risk, low risk) that a user will disengage within a period of time. In one or more implementations, the disengagement model 110 is trained to output an engagement score (or other value) to compare against one or multiple threshold engagement scores and determine whether the user is likely to disengage from a gaming application.

As mentioned above, a disengagement metric may refer to a number of different outcomes. For example, in one or more implementations, determining whether a user will disengage may refer to determining that a user will temporarily disengage such as disconnecting or disengaging from a gaming application prior to completing a current gaming session (e.g., prior to finishing a level, before other co-users disengage). Alternatively determining whether a user will disengage may refer to determining that a user will permanently disengage or disengage for a longer period of time without returning to play or otherwise engage the gaming application at a later date. Moreover, while the disengagement metric may refer to disengagement from a particular gaming application or publisher system, the disengagement metric may alternatively refer to disengagement from the gaming platform service 104 altogether, either temporarily or permanently.

In one or more implementations, the disengagement prediction model 110 may be trained to determine any number of disengagement metrics for a given user based on a set of gaming data. For example, the disengagement prediction model 110 may be trained to generate a plurality of outputs including values and/or classifications associated with whether a user will temporarily disengage (e.g., based on daily usage patterns or in anticipation of an in-game accomplishment that the user is about to complete), whether the user will permanently disengage (e.g., based on trends of gaming data over a previous period of time (e.g., 8-12 weeks)), or whether the user will disengage from the gaming platform service 104 altogether (e.g., based on historical trends of the user or co-users associated with the user).

It will be appreciated that the disengagement prediction model 110 may be trained to predict disengagement based on a variety of factors including observed gaming data associated with a specific gaming application as well as gaming data associated with different gaming applications and according to various levels of complexity. As a first non-limiting example, the disengagement prediction model 110 may employ a statistical analysis to determine that users of the gaming platform service 104 tend to disengage more quickly from one or more applications as the duration and frequency that the user engages the gaming application decreases. For instance, where the disengagement prediction model 110 observes a decrease in frequency that a user engages with gaming content for a gaming application between two weeks and three weeks after purchase of the gaming application indicative of a predicted permanent disengagement from the gaming application at four weeks, the disengagement prediction model 110 may output a disengagement metric for the user at three weeks after purchase indicating a predicted permanent disengagement five weeks after purchase.

As a second example, the disengagement prediction model 110 may employ a machine learning model or other more complex model that observes a clear trend of disengagement for a first gaming application at nine weeks after purchase, but does not observe a clear trend of disengagement for a second gaming application. The disengagement prediction model 110 may instead observe or identify other key indicators such as a number of co-users connected to a given user that regularly play the second gaming application, whether the user has accomplished a specific in-game achievement by the eight-week mark that has been observed to correlate to disengagement, or other shared characteristics between the first or second gaming application. The disengagement prediction model 110 may use this gaming data to predict a disengagement (and timing of the disengagement) by the given user based on any combination of factors.

While these examples specifically relate to predicting permanent disengagement from a gaming application, the disengagement prediction model 110 may employ similar analysis of gaming data to predict temporary disengagement from gaming content. For example, the disengagement prediction model 110 may observe patterns of gaming data (e.g., timing data, social data, gameplay data) and similarly output a disengagement metric predicting that a user will disengage from a gaming application at a specific time of day, after a specific duration of time, or in response to an observed event (e.g., a co-user disengaging, completing an in-game task). As discussed above, the disengagement prediction model 110 can utilize a simple statistical analysis and/or employ a more complex model (e.g., a machine learning model) trained to predict disengagement based on different types of gaming data.

Figure 3:
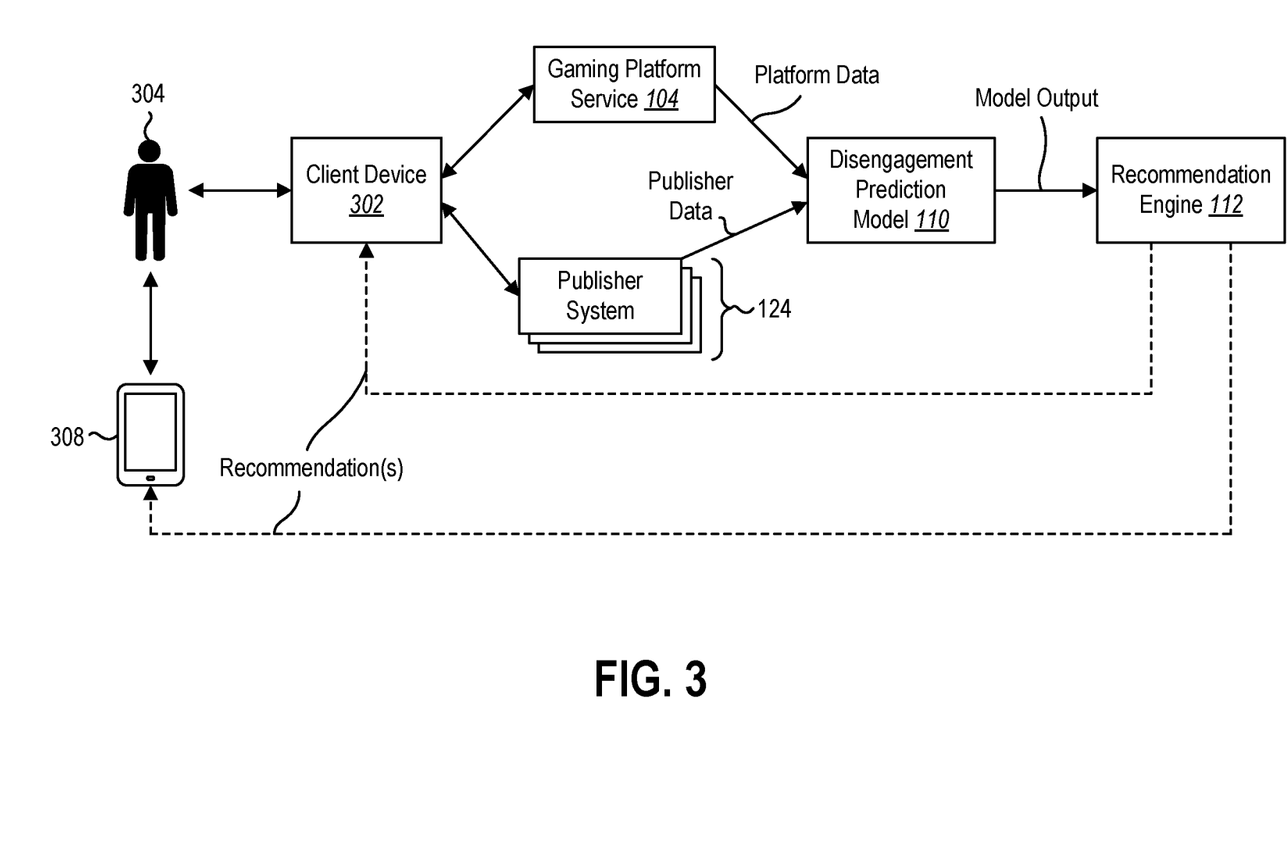
FIG. 3 illustrates an example implementation of the engagement system for predicting disengagement by an individual and providing a timely recommendation in accordance with one or more embodiments.

Once trained, the disengagement prediction model 110 may be employed by the engagement system 106 to generate a disengagement metric for a specific user in connection with a gaming application and/or gaming platform service 104. For instance, FIG. 3 illustrates an example implementation in which the disengagement prediction model 110 is used to determine one or more disengagement metrics for a user 304 of a client device 302, which may refer to any variety of the client devices 120 discussed above in connection with FIG. 1. As shown in FIG. 3, the client device 302 engages with the gaming system platform 104 and any number of publisher systems 124. Over a period of time, the gaming platform service 104 and the publisher systems 124 can collect platform system data and publisher data associated with the user 304, which may include any of the gaming data discussed above in connection with FIG. 2.

The platform system data and publisher data may be provided as inputs to the disengagement prediction model 110. The disengagement prediction model 110 may generate a model output including one or multiple disengagement metrics for the user 304 in accordance with how the disengagement prediction model 110 has been trained. For example, the disengagement prediction model 110 may output a classification or prediction that the user will disengage (and a prediction of when) from a gaming application.

As shown in FIG. 3, the disengagement prediction model 110 may provide the model output including one or multiple disengagement metrics to a recommendation engine 112. The recommendation engine 112 may generate one or more recommendations to communicate to one or more computing devices associated with the user 304. For example, as shown in FIG. 3, the disengagement prediction model 110 may provide a recommendation to the client device 302 (e.g., a gaming device that receives and provides gaming content). In addition, or as an alternative, the disengagement prediction model 110 can provide a recommendation (e.g., a similar or different recommendation) to a mobile device 308 independent from the client device 302 so as to not interrupt a gaming experience for the user 304.

The recommendation engine 112 may generate a recommendation to deliver to the user 304 in a variety of ways. For example, the recommendation engine 112 may select the recommendation from a plurality of possible recommendations associated with different disengagement metrics. For example, the recommendations may correspond to different ranges of engagement scores and the recommendation engine 112 may select and deliver a specific recommendation based on the engagement score. In addition, or as an alternative, the recommendation engine 112 may select and deliver a recommendation based on one or more user preferences indicated by the user 304 at a previous time.

The recommendation engine 112 may further determine a timing for delivering the recommendation. For example, the recommendation engine 112 may provide an in-game recommendation that appears via a notification or display on a graphical user interface of the client device 302. In addition, or as an alternative, the recommendation engine 112 may provide a recommendation at the beginning of a subsequent gaming session or when the user logs onto an account of the gaming platform service 104 at a later time.

In one or more embodiments, the recommendation engine 112 determines a method or communication medium for delivery of the recommendation as well as a timing for delivery of the recommendation based on a set of gaming data collected for the user 304. For example, the recommendation engine 112 may determine that users associated with a set of characteristics (e.g., users that play RPG games or that play solo missions) are more receptive to in-game recommendations than users associated with a different set of characteristics (e.g., users that play RTS games or that play multi-player). The recommendation engine 112 may further determine that users of a specific game may be more receptive to in-game recommendations than users of other games generally. As another example, the recommendation engine 112 may determine a timing or method of recommendation delivery based on user-indicated preferences from a user account of profile maintained by the gaming platform service 104.

In addition to timing and method of delivery, the recommendation engine 112 may generate content to include within the recommendation based on corresponding gaming data. For example, a recommendation may include an indication of co-users or friends that have recently purchased another gaming application. As another example, a recommendation may include a notification that co-user or friend has actively engaged the same or different gaming application. As another example, the recommendation may include an offer for a sale for another gaming application of the same or different publisher accessible via the gaming platform service 104. Examples of different recommendations is further discussed below in connection with FIGS. 5A-5C.

In one or more embodiments, the recommendation engine 112 determines a recommendation to provide based on a nature of the disengagement prediction. For example, where a user is predicted to temporarily disengage, the recommendation engine 112 may generate a different recommendation than when the user is predicted to permanently disengage. For instance, where a user is about to disengage from a current session, the recommendation engine 112 may provide an in-game bonus or a notification that a co-user of the gaming platform service 104 or the associated publisher system is presently engaged with the gaming application. This may include a selectable option to join the co-user or to invite the co-user to begin an objective (e.g., a quest, a match, a mini-game) together. Alternatively, where a user is about to disengage permanently from a gaming application, the recommendation engine 112 may provide an in-game bonus to take effect upon initiating another gaming session in an attempt to increase engagement by the user with the gaming application. In one or more implementations, the recommendation engine 112 provides an offer for a sale of a different game or a recommendation for a currently owned game accessible via the gaming platform service 104.

Figure 4:
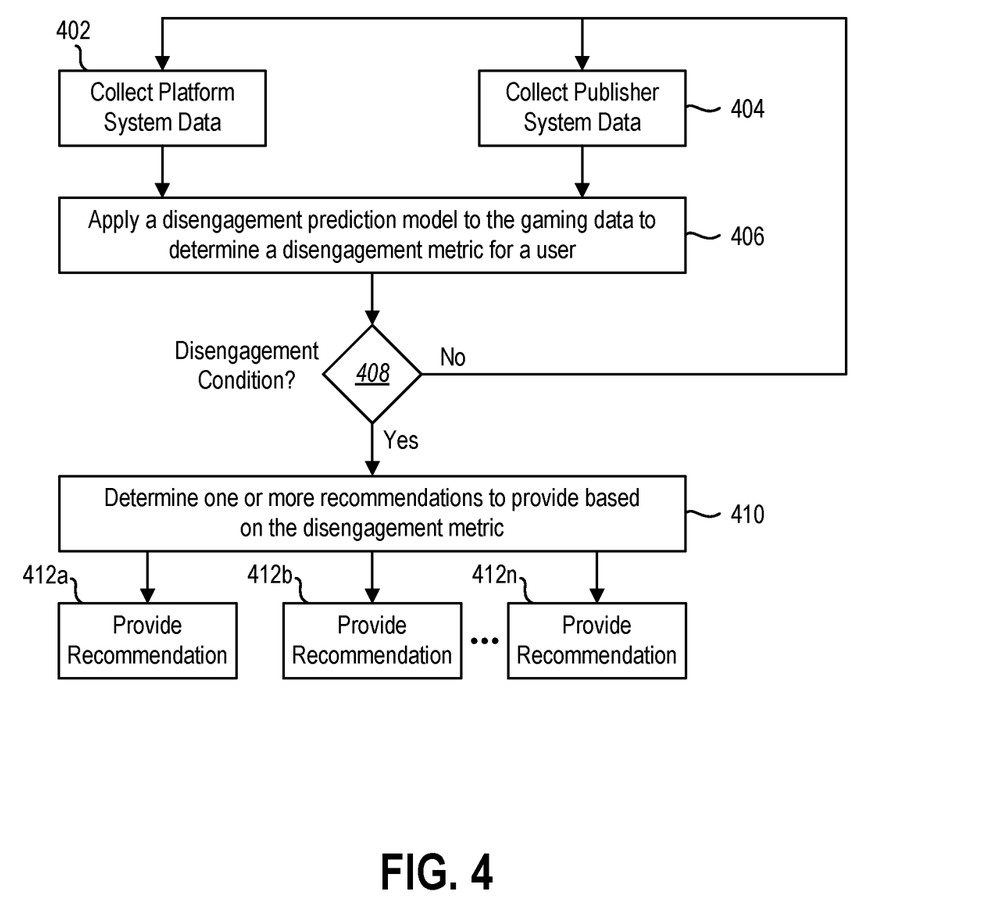
FIG. 4 illustrates an example workflow for monitoring gaming data associated with an individual and providing a timely recommendation in accordance with one or more embodiments.

FIG. 4 illustrates an example workflow for predicting disengagement of a user based on gaming data and generating a recommendation for delivery based on the predicted disengagement. For example, as shown in FIG. 4, the engagement system 106 may perform an act 402 of collecting platform system data, which may refer to any information (e.g., gaming data and user data) collected by the gaming platform service 104 for a user. The engagement system 106 may further perform an act 404 of collecting publisher data including any information collected by one or more publishing systems.

As shown in FIG. 4, the engagement system 106 can perform an act 406 of applying a disengagement prediction model 110 to the gaming data including a combination of platform system data and publisher system data to determine a disengagement metric for the user. The disengagement metric may refer to a variety of different metrics including an engagement score, classification, or other metric associated with a prediction or probability that the user associated with the collected set of gaming data will disengage from a gaming application.

The engagement system 106 may perform an act 408 of determining whether a disengagement condition exists. For example, the engagement system 106 may determine whether an engagement score exceeds a threshold score or whether one or multiple disengagement metrics trigger generation of a recommendation. If the engagement system 106 determines that no disengagement condition exists, the engagement system 106 may continue to collect platform system data and publisher system data and periodically check or monitor in real-time whether a disengagement condition is identified.

Alternatively, if the engagement system 106 determines that a disengagement condition exists, the engagement system 106 may perform an act 410 of determining one or more recommendations to provide based on the disengagement metric. For example, the engagement system 106 may perform one or a plurality of acts 412*a-n* of providing recommendations to a client device (e.g., a gaming device or a mobile device) of the user based on the disengagement metric (or detected disengagement condition). As discussed above, the engagement system 106 may identify a recommendation to provide from a number of possible recommendations or, alternatively, generate a recommendation including content and a method of delivery based on the corresponding disengagement metric.

Figures 5A, 5B, 5C:
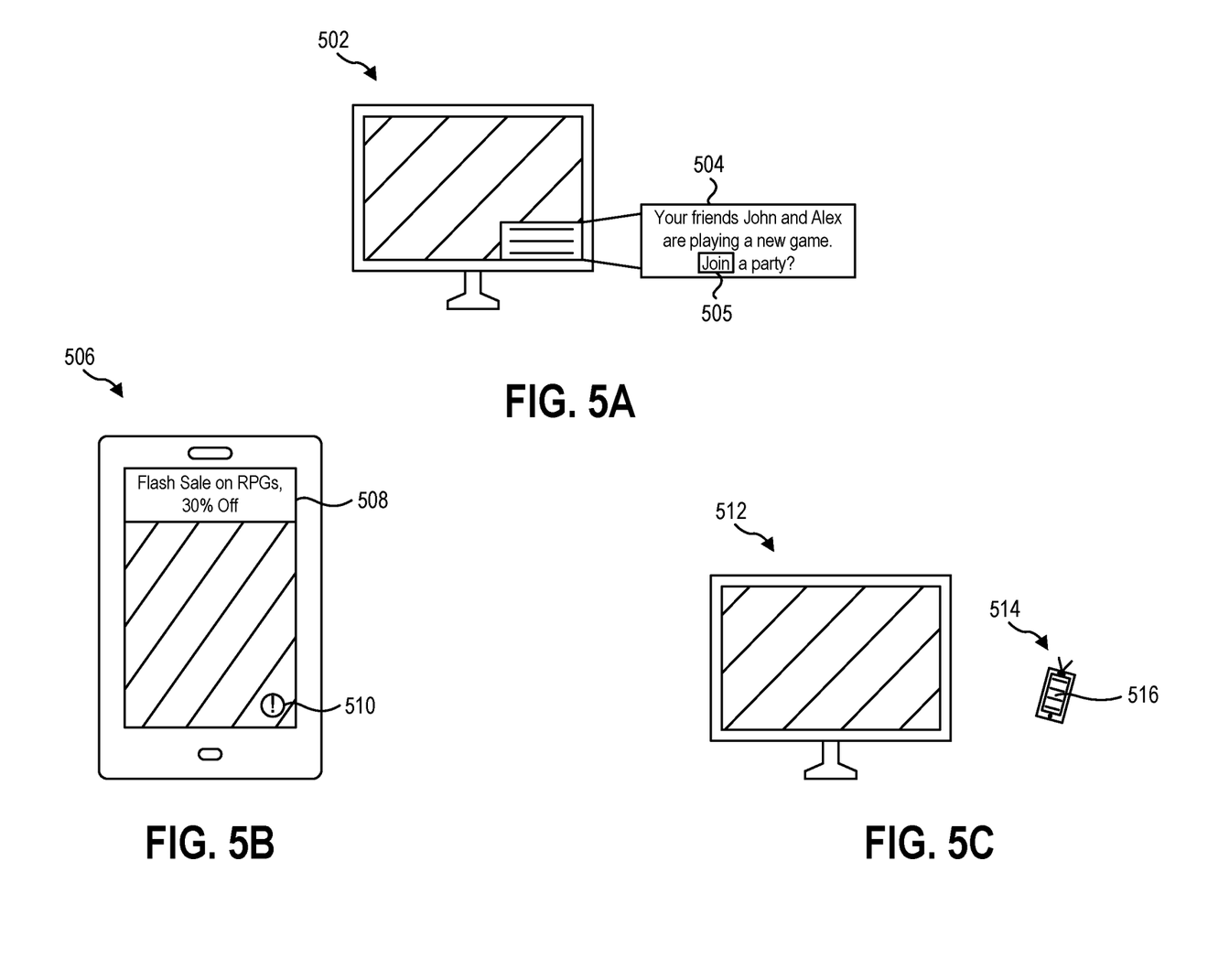
FIGS. 5A-5C illustrate example client devices for delivering a variety of recommendations in accordance with one or more embodiments.

Moving onto FIGS. 5A-5C, these figures illustrate example recommendations delivered via various client devices in accordance with one or more embodiments. For example, FIG. 5A illustrates an example implementation of a client device 502 including an in-game recommendation 504 provided via a graphical user interface of the client device 502. In this example, the client device 502 is a gaming device or other computing device that provides gaming content to a user. As shown in FIG. 5A, the in-game recommendation 504 may include a popup displayed over a portion of the gaming content and including a message that reads: "Your friends John and Alex are playing a new game" along with a selectable option 505 to "Join" a party with the indicated co-users "John" and "Alex."

The gaming platform service 104 may perform a number of actions in response to a detected selection of the selectable option 505. For example, the gaming platform service 104 may prompt a purchase of the new game or provide a trial game to enable the user to play with the indicated co-users before requiring a purchase. Alternatively, where the user currently owns the game, the gaming platform service 104 may exit out of a current gaming session and create a new gaming session while inviting the co-users to join the user in the new gaming session.

FIG. 5B illustrates another example implementation in which a mobile device 506 provides one or multiple recommendations via a graphical user interface of the mobile device 506. For example, the mobile device 506 may receive a first recommendation 508 that appears via a banner or other display including an offer for sale of one or more games. For instance, because the user of the mobile device 506 may have a preference for RPG games, the engagement system 106 may provide an offer for a sale of one or more RPG games available via the gaming platform service 104. As further shown, the mobile device 508 may receive a second recommendation 510 including an in-game perk or in-game notification of a communication generated and provided based on a disengagement metric for a user of the mobile device 506.

FIG. 5C illustrates another example implementation including a gaming device 512 and a mobile device 514. In particular, in this example, the engagement system 106 may generate and deliver a recommendation to a mobile device 514 including an email, text message, or other communication displayable via the graphical user interface 516 of the mobile device 514 so as to avoid interrupting a gaming experience of the user provided via the gaming device 512. This recommendation may be based on characteristics of other users, a history of interaction with similar types of recommendations, or based on indicated preferences of a user of the gaming device 512 and mobile device 514.

Figure 6:
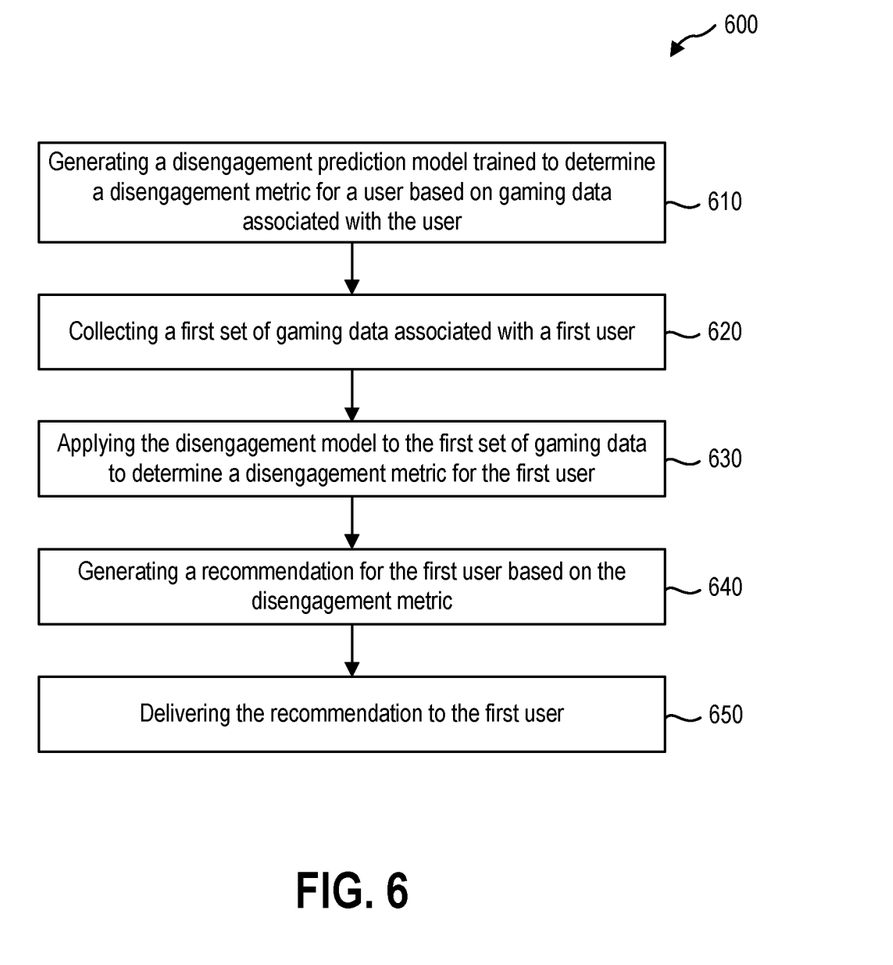
FIG. 6 illustrates an example method for predicting disengagement and providing a recommendation in accordance with one or more embodiments.

Turning now to FIG. 6, this figure illustrates example flowcharts including series of acts for predicting disengagement from a gaming application and providing a recommendation based on the predicted disengagement. While FIG. 6 illustrates acts according to one or more embodiments, alternative embodiments may omit, add to, reorder, and/or modify any of the acts shown in FIG. 6. Moreover, one or more of the individual features and functionalities described in connection with individual acts or series of acts in connection with FIG. 6 may similarly apply to other embodiments and examples described herein. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

FIG. 6 illustrates a series of acts 600 for predicting a disengagement by a user with gaming content and providing a recommendation based on the predicted disengagement. For example, as shown in FIG. 6, the series of acts 600 includes an act 610 of generating a disengagement prediction model trained to determine a disengagement metric for a user based on gaming data associated with the user. For example, the act 610 may include generating, receiving, or otherwise identifying a disengagement prediction model trained to determine a disengagement metric for a given user based on gaming data associated with the given user. The gaming data may include a variety of types of gaming data. For example, the gaming data may include publisher gaming data including information collected by one or more publisher systems associated with one or more publishers of the gaming data. The gaming data may further include platform gaming data including information collected by a gaming platform service.

In one or more embodiments, identifying the disengagement prediction model includes generating or otherwise training the disengagement prediction model. For example, in one or more embodiments, identifying a disengagement prediction model includes receiving gaming data for a plurality of training users where the gaming data for the plurality of training users includes a combination of publisher gaming data including information collected by a plurality of publisher systems and platform gaming data including information collected by a gaming platform service. Identifying the disengagement prediction model may further include training the disengagement prediction model based on the gaming data for the plurality of training users to determine one or more disengagement metrics for the given user based on gaming data associated with the given user.

As further shown, the series of acts 600 may include an act 620 of collecting a first set of gaming data associated with a first user. For example, the act 620 may include collecting, receiving, or otherwise accessing a first set of gaming data associated with a first user. In one or more implementations, receiving the first set of gaming data includes collecting publisher data associated with the first user collected by the one or more publisher systems. Receiving the first set of gaming data may further include collecting platform gaming data collected by the gaming platform service.

In one or more embodiments, receiving the first set of gaming data includes collecting a combination of publisher gaming data and platform gaming data. For example, receiving the first set of gaming data may include collecting a first subset of gaming data associated with the first user including platform gaming data collected by the gaming platform service. Receiving the first set of gaming data may further include collecting a second subset of gaming data associated with the first user including publisher gaming data collected by the one or more publisher systems.

In one or more implementations, the first set of gaming data includes publisher gaming data associated with the first user and/or the first application. For example, the first set of gaming data may include gameplay data including in-game statistics for the first user in connection with the first gaming application. The first set of gaming data may also include publisher social data including information associated with co-users of the first gaming application that have connected with the first user via the first gaming application.

In one or more implementations, the first set of gaming data includes platform gaming data including platform-agnostic associated with the first user and/or the one or multiple gaming applications. For example, the first set of gaming data may include system social data including information associated with identified co-users connected to the first user via a platform of the gaming platform service. The first set of gaming data may also include system usage statistics including timing data associated with a duration and frequency that the first user has engaged with the first gaming application over a historical period of time. The first set of gaming data may also include system profile data including user identification information associated with the first user and maintained by the gaming platform service.

The series of acts 600 may further include an act 630 of applying the disengagement model to the first set of gaming data to determine a disengagement metric for the first user. For example, the act 630 may include applying the disengagement model to the first set of gaming data to determine a disengagement metric for the first user in connection with a first gaming application. In one or more embodiments, the disengagement prediction model includes a machine learning model trained to generate an output including one or multiple disengagement metrics based on a predicted likelihood that the given user will disengage from a gaming application within a predetermined period of time.

The disengagement metric may include a variety of outputs or values (e.g., one or multiple values) from the disengagement prediction model. For example, the disengagement metric may include a prediction that the first user will disengage temporarily from the first gaming application. The disengagement may also include a prediction that the first user will disengage permanently from the first gaming application. The disengagement metric may also include a prediction that the first user will both temporarily and permanently disengage from the first gaming application. The disengagement metric may also include a prediction of a time at which the first user will either temporarily or permanently disengage from the first gaming application. In one or more embodiments, the disengagement metric includes a classification of the first user associated with a likelihood that the first user will disengage prior to completing a current gaming session or permanently disengage from the first gaming application within a predetermined period of time.

The series of acts 600 may also include an act 640 of generating a recommendation for the first user based on the disengagement metric. As further shown, the series of acts 600 may include an act 650 of delivering the recommendation to the first user. For example, the act 650 may include delivering, transmitting, or otherwise providing the recommendation to the first user via a client device of the first user. In one or more embodiments, the client device includes a mobile device independent from one or more gaming devices on which gaming content was engaged by the first user.

Alternatively, in one or more embodiments, the client device refers to a gaming device of the first user. In one or more implementations, the series of acts 600 may include generating an additional recommendation for the first user based on the disengagement metric for the first user. The series of acts 600 may further include providing the additional recommendation to the first user via a mobile device of the first user (e.g., where the mobile device is an independent device from the gaming device).

As indicated above, the recommendation may include a variety of types of recommendations as well as a variety of content included therein. For example, the recommendation may include an in-game offer for the first gaming application. As another example, the recommendation may include an in-game notification of one or more co-users of a gaming platform service connected with the first user currently engaged with a second gaming application. As another example, the recommendation may include one or more delayed notifications to provide to the first user via an interface of the gaming platform service.

The recommendation may further include a recommendation for a second gaming application corresponding to a same publisher or different publisher as the first gaming application. The recommendation may also include an offer to receive one or more in-game purchases associated with the first gaming application or the second gaming application at a discount. The recommendation may also include an identification of one or more co-users of a gaming platform service connected with the first user that have recently engaged a second gaming application. The recommendation may further include an identification that the one or more co-users that have recently disengaged from the first gaming application.

In one or more embodiments, the series of acts 600 includes identifying a time for delivery of the recommendation to the first user of the client device based on a timing that the disengagement metric indicates that the first user is predicted to disengage from the first gaming application. In one or more implementations, providing the recommendation includes delivering the recommendation at the identified time and prior to when the first user is predicted to disengage.

Figure 7:
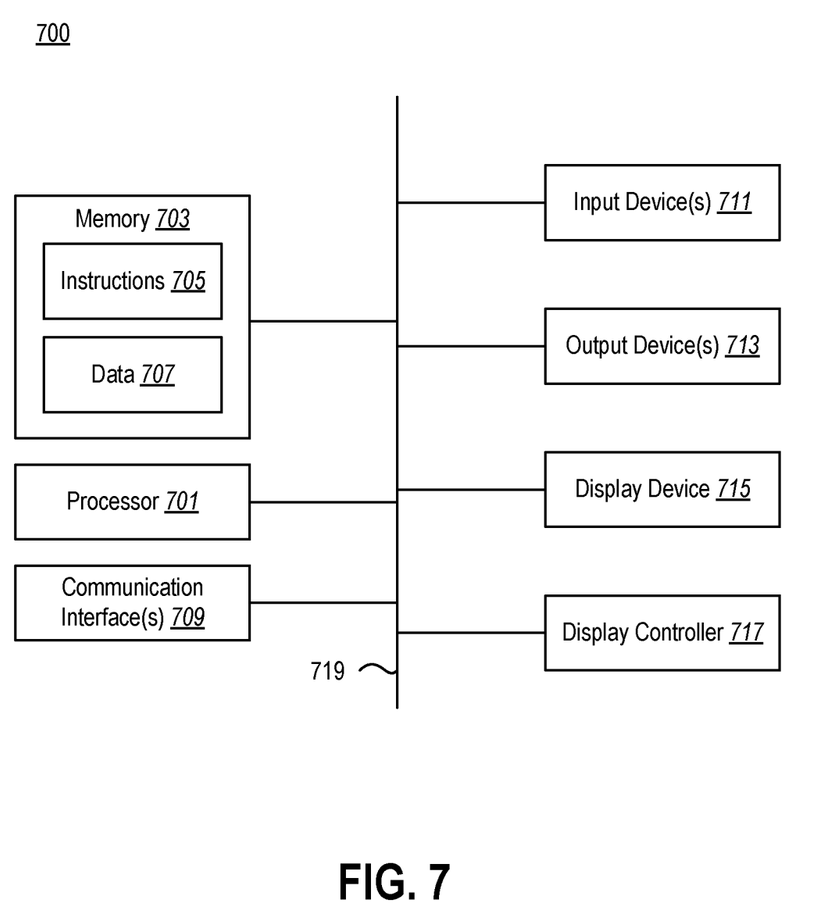
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    identifying a disengagement prediction model trained to determine a disengagement metric for a given user based on gaming data associated with the given user, the gaming data being obtained at a gaming platform service, the gaming platform service including a platform over which applications associated with different publishers are accessible to the given user;
    receiving a first set of gaming data associated with a first user, the first set of gaming data including social data obtained by the gaming platform service, the first set of gaming data being associated with one or more co-users of the first gaming application that have connected with the first user via the first gaming application, the social data including whether the one or more co-users have engaged with a second gaming application accessible to the user via the gaming platform;
    applying the disengagement model to the first set of gaming data to determine a disengagement metric for the first user in connection with the first gaming application based at least in part on the social data indicating that the one or more co-users have engaged with the second gaming application;
    generating a recommendation for the first user based on the disengagement metric for the first user; and
    providing the recommendation to the first user via a client device of the first user.

2. The method of claim 1, wherein the gaming data comprises publisher gaming data including information collected by one or more publisher systems associated with one or more publishers of the gaming data, and wherein receiving the first set of gaming data associated with the first user comprises collecting publisher data associated with the first user collected by the one or more publisher systems.

3. The method of claim 1, wherein the first set of gaming data associated with the first user comprises:
    a first subset of gaming data associated with the first user including platform gaming data collected by the gaming platform service; and
    a second subset of gaming data associated with the first user including publisher gaming data collected by the one or more publisher systems and received at the gaming platform service.

4. The method of claim 1, wherein the disengagement metric comprises one or more of:
    a prediction that the first user will disengage temporarily from the first gaming application;
    a prediction that the first user will disengage permanently from the first gaming application;
    a prediction that the first user will both temporarily and permanently disengage from the first gaming application; or
    a prediction of a time at which the first user will either temporarily or permanently disengage from the first gaming application.

5. The method of claim 1, wherein the disengagement metric includes a classification of the first user associated with a likelihood that the first user will disengage prior to completing a current gaming session or permanently disengage from the first gaming application within a predetermined period of time.

6. The method of claim 1, wherein the social data further comprises:
    publisher social data collected by a publisher of the first gaming application, the publisher social data including information associated with co-users of the first gaming application that have connected with the first user via the first gaming application.

7. The method of claim 1, wherein the first set of gaming data comprises platform gaming data, wherein the platform gaming data comprises publisher-agnostic data including one or more of:
    system social data including information associated with identified co-users connected to the first user via a platform of the gaming platform service;
    system usage statistics including timing data associated with a duration and frequency that the first user has engaged with the first gaming application over a historical period of time; or
    system profile data including user identification information associated with the first user and maintained by the gaming platform service.

8. The method of claim 1, further comprising identifying a time for delivery of the recommendation to the first user of the client device based on a timing that the disengagement metric indicates that the first user is predicted to disengage from the first gaming application, wherein providing the recommendation to the first user comprises delivering the recommendation at the identified time and prior to when the first user is predicted to disengage.

9. The method of claim 1, wherein the client device comprises a mobile device independent from one or more gaming device on which gaming content was engaged by the first user.

10. The method of claim 1, wherein the recommendation includes:
    an in-game notification indicating that at least one of the one or more co-users of a gaming platform service connected with the first user currently has engaged with the second gaming application.

11. The method of claim 1, wherein the recommendation includes:
    a recommendation associated with the second gaming application, the second gaming application corresponding to a same publisher or different publisher as the first gaming application.

12. The method of claim 11, wherein the recommendation includes an offer to receive an in-game purchase associated with the second gaming application.

13. The method of claim 1, wherein the recommendation includes one or more of:
an identification of the one or more co-users of a gaming platform service connected with the first user that have recently engaged the second gaming application; or
an identification that the one or more co-users that have recently disengaged from the first gaming application.

14. The method of claim 1, wherein identifying the disengagement prediction model comprises:
receiving gaming data for a plurality of training users, wherein the gaming data for the plurality of training users includes a combination of publisher gaming data including information collected by a plurality of publisher systems and platform gaming data including information collected by a gaming platform service; and
training the disengagement prediction model based on the gaming data for the plurality of training users to determine one or more disengagement metrics for the given user based on gaming data associated with the given user.

15. The method of claim 1, wherein the recommendation includes a delayed notification provided to the first user via an interface of the gaming platform service after temporarily disengaging from the first application.

16. The method of claim 1, wherein the disengagement prediction model is a machine learning model trained to generate a disengagement prediction based on input data comprising the gaming data.

17. A system, comprising:
one or more processors;
a memory in electronic communication with the one or more processors; and
instructions stored in the memory, the instructions being executable by the one or more processors to:
identify a disengagement prediction model trained to determine a disengagement metric for a given user based on gaming data associated with at least one of the given user or at least one of a given first gaming application, the gaming data being obtained at a gaming platform service, the gaming platform service including a platform over which applications associated with different publishers are accessible to the given user;
receive a first set of gaming data associated with a first user, the first set of gaming data including social data obtained by the gaming platform service, the first set of gaming data being associated with one or more co-users of the first gaming application that have connected with the first user via the first gaming application, the social data including whether the first user plays a gaming application with one or more co-users;
apply the disengagement model to the first set of gaming data to determine a disengagement metric for the first user in connection with the first gaming application based at least in part on the social data indicating that the first user has played the gaming application with the one or more co-users;
generate a recommendation for the first user based on the disengagement metric for the first user; and
provide the recommendation to the first user via a client device of the first user.

18. The system of claim 17, wherein the disengagement metric includes one or more of:
a prediction that the first user will disengage temporarily from the first gaming application;
a prediction that the first user will disengage permanently from the first gaming application;
a prediction that the first user will both temporarily and permanently disengage from the first gaming application; or
a prediction of a time at which the first user with either temporarily or permanently disengage from the first gaming application.

19. The system of claim 17, wherein the client device comprises a gaming device of the first user, and wherein the system further comprises instructions stored on the memory and executable by the one or more processors to:
generate an additional recommendation for the first user based on the disengagement metric for the first user; and
provide the additional recommendation to the first user via a mobile device of the first user.

20. A computer-readable medium storing instructions thereon that, when executed by one or more processors, causes a computing device to:
identify a disengagement prediction model trained to determine a disengagement metric for a given user based on gaming data associated with the given user, the gaming data being obtained at a gaming platform service, the gaming platform service including a platform over which applications associated with different publishers are accessible to the given user;
receive a first set of gaming data associated with a first user, the first set of gaming data including social data obtained by the gaming platform service, the first set of gaming data being associated with one or more co-users of the first gaming application that have connected with the first user via the first gaming application, the social data including whether the first user plays a first gaming application game with the one or more co-users;
apply the disengagement model to the first set of gaming data to determine a disengagement metric for the first user in connection with the first gaming application based at least in part on the social data indicating that the first user has played the gaming application with the one or more co-users;
generate a recommendation for the first user based on the disengagement metric for the first user; and
provide the recommendation to the first user via a client device of the first user.

* * * * *